(No Model.)

W. F. BIRGE.
DISINTEGRATING MACHINE.

No. 345,408. Patented July 13, 1886.

Witnesses.
Henry Ashbery
J. M. Caldwell.

Inventor.
Walter F. Birge,
By James Sangster
Atty.

UNITED STATES PATENT OFFICE.

WALTER F. BIRGE, OF BUFFALO, NEW YORK.

DISINTEGRATING-MACHINE.

SPECIFICATION forming part of Letters Patent No. 345,408, dated July 13, 1886.

Application filed February 17, 1886. Serial No. 192,176. (No model.)

*To all whom it may concern:*

Be it known that I, WALTER F. BIRGE, a citizen of the United States, residing in Buffalo, in the county of Erie and State of New York, have invented certain new and useful Improvements in Disintegrating-Machines, of which the following is a specification.

The object of this invention is to produce an efficient disintegrating-machine for grain or other materials, either in a dry, wet, or semi-fluid condition; but it is especially adapted for the disintegrating of grain used in the manufacture of starch, the construction and operation of which will be fully and clearly hereinafter described, shown, and claimed by reference to the accompanying drawings, in which—

Figure 1:
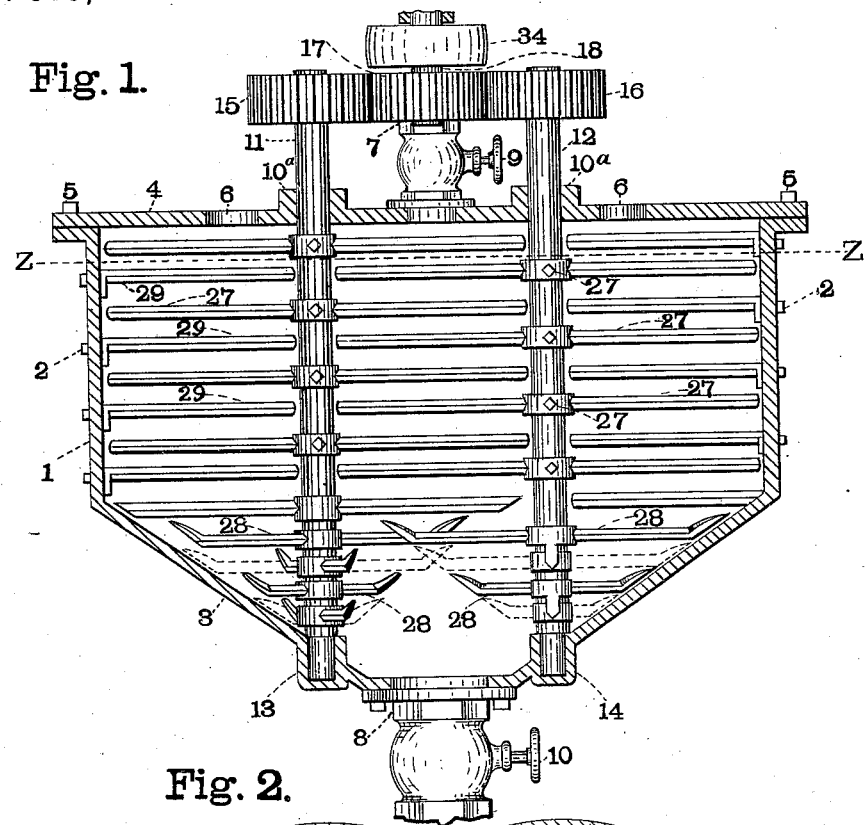
Figure 2:
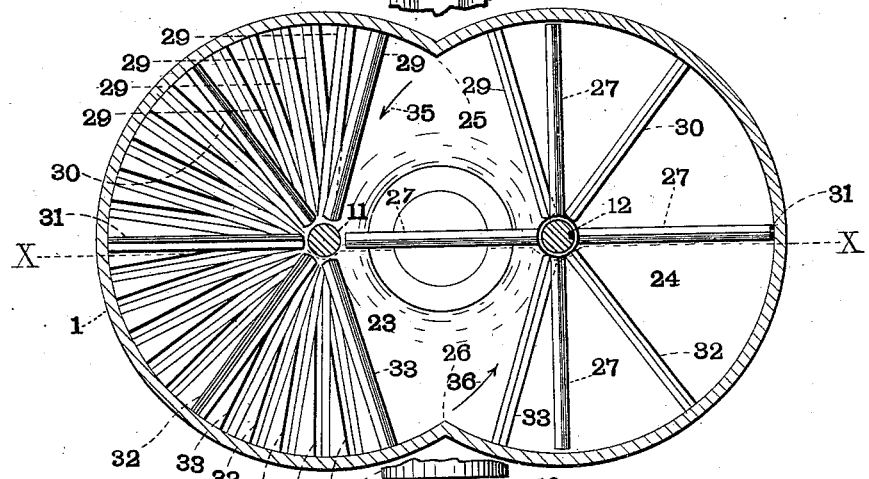
Figure 3:
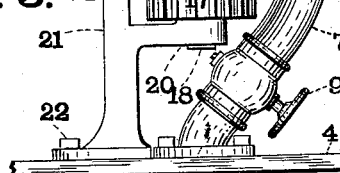

Figure 1 is a vertical central section through the shell or case on line X X, Fig. 2. Fig. 2 is a horizontal section on line Z Z, Fig. 1, a portion of the arms on the interior of the case being left off so as to show the first arms of each series more clearly; and Fig. 3 represents a detached portion of the top, showing the way the feed-pipe is connected, and also a suitable means for connecting the driving-shaft, its pulley, and gear-wheel directly to the top of the shell or case.

In said drawings, 1 represents the case or shell. It is made of either cast or boiler iron, preferably of cast-iron, as being the cheapest and best material for the purpose, and should be about one inch thick, (more or less,) according to size. The lower part, 3, is made of a tapering form, as shown in Fig. 1, but any other suitable shape may be used. The shape of the body of this case and the construction of the beaters is such that even if the bottom were flat the material while being subjected to the action of the beaters, although acted on by centrifugal force and thrown toward the side or peripheries, would still be swept to the center of the case, where the discharge-pipe is preferably located; but where the bottom is of a tapering or concave form the length of the lower beaters should vary to suit such form, as will be more clearly hereinafter described.

The top 4 of the case 1 is closely fitted thereto by bolts 5, and is provided with hand-holes 6, placed at suitable points, so that the interior may be got at and examined when required without the necessity of taking off the whole top; but at the same time this top is made removable, so that it can be taken off whenever it may become necessary to do so.

7 represents the inlet or feed pipe. The outlet or discharge pipe 8 is made about one-third larger in diameter than the feed-pipe, so as to afford at all times a free outlet for the material. Both of these pipes are provided with valves, 9 being the valve on the feed-pipe and 10 the discharge-pipe valve, so that the feed and discharge of the material may be regulated, as required. The top is also provided with two boxes, 10ª, in which the two vertical shafts 11 and 12 work. The feet of the shafts 11 and 12 work in boxes 13 and 14. These boxes may be made in any well-known way suitable for the purpose.

The gear-wheels 15 and 16 are keyed or otherwise secured to the shafts 11 and 12, and the intermediate wheel, 17, is secured to a vertical shaft, 18. As represented in Fig. 1, this shaft is adapted to be secured in any well-known way to a hanger from the ceiling or to a framework above the machine, or it may be secured in bearings 19 and 20, having the supporting portion 21 connected directly to the top 4 by bolts 22. (See Fig. 3.)

The case or shell 1 is formed so that the end portions of the body 23 and 24 are of cylindrical form, the two portions occupying about two-thirds of a circle each, and being united at the points 25 26. (See Fig. 2.) The shafts 11 and 12 are in the centers of these portions, and are provided with a series of beaters, 27 and 28. These beaters are usually made of steel bars, preferably of about one inch in diameter, and of square or triangular form, and set so that one of their sharp edges points directly in the line of their rotary movements. Between the beaters is a series of bars 29, 30, 31, 32, and 33, bolted or otherwise secured to the sides of the shell by bolts 2, so that their extremities shall extend toward the center or toward the shafts 11 and 12. Each series of these bars is preferably arranged spirally within the case. (See the portion 23, Fig. 2, where the whole of each series is shown.) In the other portion, 24, of the case only the top bar of each series is represented, so that each separate series of bars may be shown more clearly. These bars are made to come as near as possible to the shafts without touching them, and the outer ends of the beaters are long enough to nearly come in contact with the interior of the case, or within a quarter of an inch of it.

It will be noticed that the arrangement of the beaters is such that they pass between the series of stationary bars and also between the nearly-opposite flights of beaters upon the other shaft. The arrangement of the stationary bars within the case as described is not arbitrary, as they may be located in a line directly below each other, or in a zigzag position, if desired.

The beaters 28 are made to sweep around and nearly touch the sides of the tapering portion of the case, so as to sweep off any of the material that may lodge there.

The operation is as follows: The beaters are intended to run at a high rate of speed, and as the material is fed in through the feed-pipe they act upon it while partly in suspension as it passes through from the top to the bottom. As it enters the disintegrator it is struck by the revolving arms with considerable force and is caught by the stationary arms and subjected to violent percussion at all points from various directions during its passage through the machine. The rapidity of the passage of the material through the machine and the degree and duration of the striking force exerted upon it are regulated in part by gravity and in part by the speed of the revolving arms.

It will be seen by referring to Fig. 2 that the form of the case or shell is such that as the material is swept around by the beaters the centrifugal force will throw it toward the sides; but it will also be noticed that as it reaches the point shown by the arrows it is thrown directly toward the centers, that on one side passing in the direction of the arrow 35, toward the shaft 11, and that on the side going in the direction of the arrow 36 is thrown toward the shaft 12. Thus it will be seen the material is continually forced from the center toward the circumference and from the circumference to the center, so that every portion of it is thoroughly operated upon before it leaves the machine.

I claim as my invention—

1. In a disintegrating-machine, the case 1, provided with inwardly-projecting stationary arms, and having the outlet-opening of larger area than the inlet-opening, as and for the purposes specified, in combination with two vertical shafts, 11 and 12, set in bearings in the case and connected together by gearing 15, 16, and 17, and provided with beaters, substantially as and for the purposes described.

2. In a disintegrating-machine, the case or shell provided with cylindrical portions and a tapering bottom, inwardly-projecting stationary arms, feed and discharge pipes having valves, and the shaft-bearings, in combination with two vertical shafts set in said bearings and gears for simultaneously operating said shafts, each shaft being provided with a series of beaters adapted to the cylindrical portions of the case, and a series of beaters of varying lengths adapted to sweep the material from its tapering or concave bottom toward the outlet, substantially as specified.

WALTER F. BIRGE.

Witnesses:
JENNIE M. CALDWELL,
JAMES SANGSTER.